US012773911B2

(12) United States Patent
Okazaki et al.

(10) Patent No.: US 12,773,911 B2
(45) Date of Patent: Oct. 27, 2026

(54) ELECTRIC WORK VEHICLE

(71) Applicant: Kubota Corporation, Osaka (JP)

(72) Inventors: Kazuto Okazaki, Sakai (JP); Shunya Takase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/050,272

(22) Filed: Feb. 11, 2025

(65) Prior Publication Data

US 2025/0229645 A1 Jul. 17, 2025

Related U.S. Application Data

(63) Continuation of application No. PCT/JP2023/001817, filed on Jan. 23, 2023.

(30) Foreign Application Priority Data

Aug. 30, 2022 (JP) ................................ 2022-136871

(51) Int. Cl.
*B60L 15/20* (2006.01)
*B60L 50/60* (2019.01)
*B60L 58/12* (2019.01)

(52) U.S. Cl.
CPC ........... *B60L 15/2045* (2013.01); *B60L 50/60* (2019.02); *B60L 58/12* (2019.02); *B60L 2200/40* (2013.01);
(Continued)

(58) Field of Classification Search
None
See application file for complete search history.

(56) References Cited

U.S. PATENT DOCUMENTS

2016/0149520 A1* 5/2016 Ota ........................ A01D 34/90 318/287
2019/0381988 A1 12/2019 Matsuda et al.
(Continued)

FOREIGN PATENT DOCUMENTS

JP 2002027815 A 1/2002
JP 2013110893 A 6/2013
(Continued)

OTHER PUBLICATIONS

International Search Report in PCT/JP2023/001817, mailed Apr. 18, 2023, 3 pages.
(Continued)

*Primary Examiner* — Madison R. Inserra
(74) *Attorney, Agent, or Firm* — Keating & Bennett, LLP

(57) ABSTRACT

An electric work vehicle includes a power storage to store power, a motor to drive at least either a travel device or a work device by consuming the power stored in the power storage, a remaining amount detector to detect a remaining amount of power suppliable by the power storage, and a controller configured or programmed to switch between a first control to control driving of the motor in response to a remaining amount value indicative of the remaining amount being greater than a preset threshold, and a second control to control driving of the motor so that power consumption of the motor is smaller than in the first control in response to the remaining amount value being less than or equal to the threshold.

7 Claims, 6 Drawing Sheets

(52) U.S. Cl.
CPC ....... *B60L 2250/16* (2013.01); *B60L 2260/52* (2013.01)

(56) References Cited

U.S. PATENT DOCUMENTS

| | | | | |
|---|---|---|---|---|
| 2020/0163275 | A1* | 5/2020 | Zhao | A01D 34/006 |
| 2020/0282972 | A1 | 9/2020 | Manji | |
| 2021/0365044 | A1* | 11/2021 | Xue | G05D 1/0289 |
| 2022/0049467 | A1* | 2/2022 | Hirose | B60K 25/00 |
| 2022/0275601 | A1* | 9/2022 | Kunizawa | E02F 3/325 |
| 2023/0189702 | A1* | 6/2023 | Prinzo | B60L 15/2045 56/10.2 A |
| 2024/0017736 | A1* | 1/2024 | Kume | B60K 35/22 |

FOREIGN PATENT DOCUMENTS

| | | | |
|---|---|---|---|
| JP | 2019156109 | A | 9/2019 |
| JP | 2019221058 | A | 12/2019 |

OTHER PUBLICATIONS

Official Communication issued in corresponding European Patent Application No. 23859665.4, mailed on Jul. 8, 2026, 9 pages.

* cited by examiner

ELECTRIC WORK VEHICLE

CROSS REFERENCE TO RELATED APPLICATIONS

This application claims the benefit of priority to Japanese Patent Application No. 2022-136871 filed on Aug. 30, 2022 and is a Continuation Application of PCT Application No. PCT/JP2023/001817 filed on Jan. 23, 2023. The entire contents of each application are hereby incorporated herein by reference.

BACKGROUND OF THE INVENTION

1. Field of the Invention

The present invention relates to electric work vehicles.

2. Description of the Related Art

For example, JP 2013-110893A discloses an electric work vehicle ("electric work machine") that is provided with a power storage ("battery") storing power, a motor ("electric motor") that can perform driving based on the power stored in the power storage, and a remaining amount detector ("remaining amount detection means") that detects the remaining amount of power that the power storage can supply.

SUMMARY OF THE INVENTION

In the electric work vehicle disclosed in JP 2013-110893A, the end time of the work is reported based on a detection value detected by the remaining amount detector and a pre-stored detection value. Meanwhile, there may be cases where the driver forcibly continues the work even after being informed of the end time of the work. However, according to the configuration of the electric work vehicle disclosed in JP 2013-110893A, if the driver forcibly continues the work, there will be the risk that the supply power of the power storage will be depleted while the electric work vehicle is moving after the end of the work. In the case of a work vehicle including a power source that is an internal combustion engine, even if the fuel for the internal combustion engine is depleted, the work vehicle can travel again by refueling on the spot. In the case of an electric work vehicle, if the supply power of the power storage is depleted during movement, it will be necessary to arrange a tow vehicle to tow the electric work vehicle to a charging location, a power supply vehicle for charging, and the like. Accordingly, if the power supply of the electric work vehicle is depleted during movement, the driver or the like is forced to do more cumbersome work than in the case of a work vehicle whose power source is an internal combustion engine. Therefore, there is room for improvement to ensure that the supply power of the power storage is not depleted until the electric work vehicle arrives at the charging location.

Example embodiments of the present invention provide electric work vehicles that move without depleting supply power of a power storage.

An electric work vehicle according to an example embodiment of the present invention includes a travel device, a power storage to store power, a motor to drive at least either the travel device or the work device by consuming the power stored in the power storage, a remaining amount detector to detect a remaining amount of power suppliable by the power storage, and a controller configured or programmed to switch between a first control to control driving of the motor in response to a remaining amount value indicative of the remaining amount being greater than a preset threshold, and a second control to control driving of the motor so that power consumption of the motor is smaller than in the first control in response to the remaining amount value being less than or equal to the threshold.

According to an example embodiment of the present invention, the controller is configured or programmed to switch between the first control and the second control, and the power consumption of the motor is smaller in the second control than in the first control. Accordingly, when the remaining amount of power in the power storage is reduced, the consumption of the power remaining in the power storage is suppressed by reducing the power consumption of the motor. With this, the driver can drive the electric work vehicle and move the electric work vehicle to the charging location before the power of the power storage is depleted. This realizes an electric work vehicle that moves without depleting supply power of a power storage.

In an example embodiment of the present invention, preferably, the electric work vehicle further includes a threshold setter manually operable to set the threshold.

Since the distance between the work target location and the charging location varies depending on the work environment, it is desirable to have a configuration that allows the threshold to be set according to the work environment. In this configuration, for example, the threshold can be set according to the distance between the work target location and the charging location. Accordingly, when the electric work vehicle travels for work, the electric work vehicle can consume all the power that can be supplied by the storage device, and can travel to the charging location without depleting the power during the travel.

In an example embodiment of the present invention, preferably, the threshold is set within a range of about 5 percent or more and about 20 percent or less of a total capacity of power suppliable by the power storage.

According to the present configuration, it is possible to set the threshold to an appropriate value before the power suppliable by the power storage is depleted.

In an example embodiment of the present invention, preferably, the electric work vehicle further includes a work motive power transmitter to perform motive power transmission from the motor to the work device, and the controller is configured or programmed to control, in the second control, the work motive power transmitter to interrupt the motive power transmission.

According to the present configuration, in the second control, the work device is no longer driven, and the electric work vehicle can only travel based on the second control. Accordingly, the consumption of the power remaining in the power storage is suppressed.

In an example embodiment of the present invention, preferably, the electric work vehicle further includes a link to which the work device is connectable, the link being movable up and down between a work position at which the work device performs work, and a non-work position higher than the work position, and an elevator configured to lift and lower the link, and in the second control, in response to the link being located at the work position, the controller is configured or programmed to control the elevator to lift the link to the non-work position.

According to the present configuration, in the second control, the work device can no longer perform ground work. This suppresses the consumption of the power remaining in the power storage.

In an example embodiment of the present invention, preferably, in response to the remaining amount value reaching a value less than or equal to the threshold during execution of the first control, the controller is configured or programmed to stop driving the motor.

According to the present configuration, it is possible to avoid the risk that the driver forcibly continues the work in a state where the remaining amount value of the power suppliable by the power storage is less than or equal to the threshold.

In an example embodiment of the present invention, preferably, the electric work vehicle further includes a manually operable operation tool, and the controller is configured or programmed to switch to the second control in response to the operation tool being operated with the remaining amount value being less than or equal to the threshold.

According to the present configuration, the controller is configured or programmed to execute the second control based on human operation performed on the operation tool, from a state in which the driving of the motor is stopped. This avoids the risk that switching from the first control to the second control will be made without the driver noticing.

In an example embodiment of the present invention, preferably, the electric work vehicle further includes a display to display the remaining amount, and the display displays the remaining amount within a range from a total capacity of power suppliable by the power storage to the threshold.

According to the present configuration, the driver can perform an operation together with normal work travel, based on the remaining amount displayed on the display.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing a layout of an inverter and the like.

DETAILED DESCRIPTION OF THE EXAMPLE EMBODIMENTS

Figure 1:
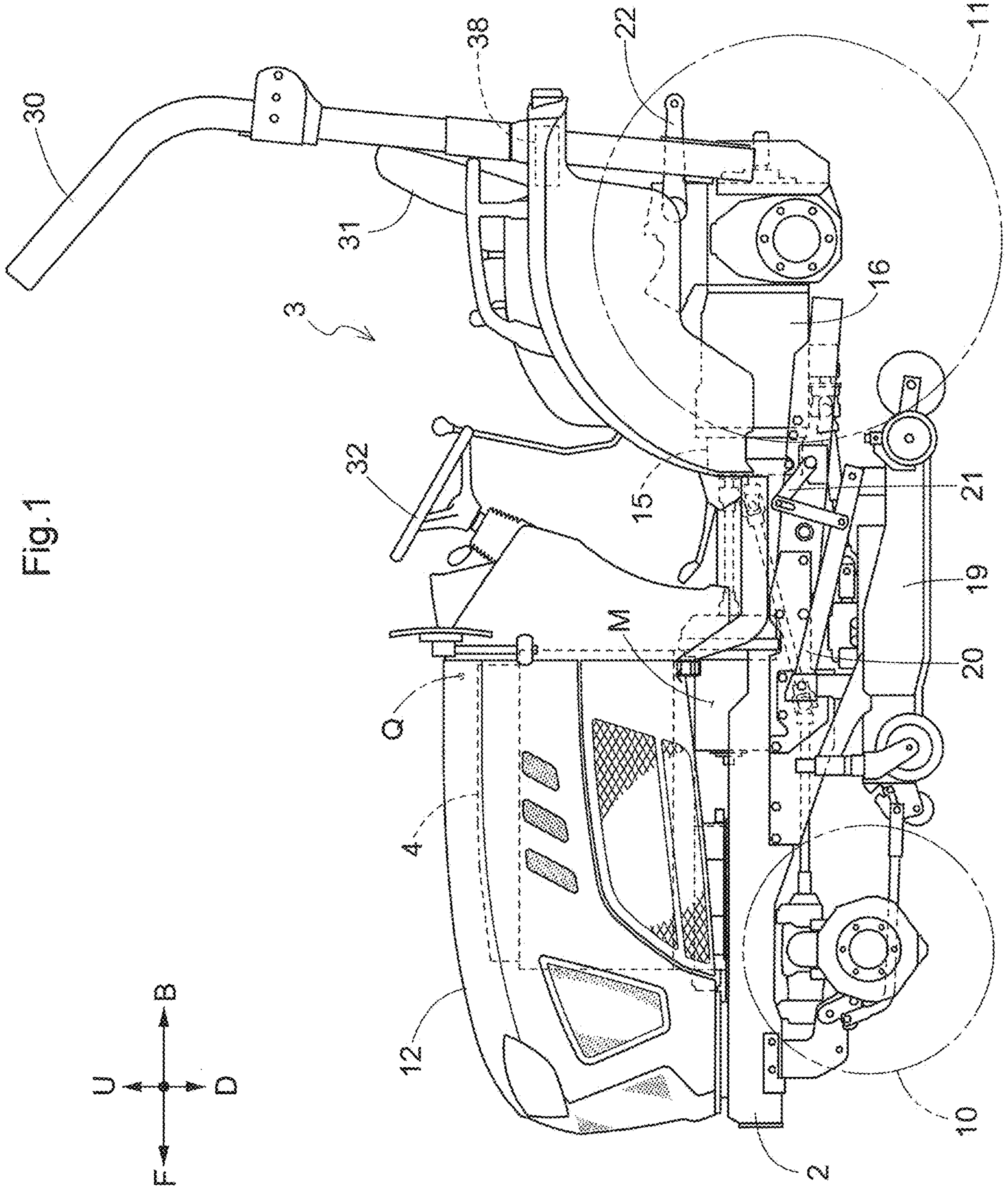
FIG. 1 is a left side view of an electric tractor.

Example embodiments of the present invention will be described with reference to the drawings. Note that, in the following description, unless otherwise stated, the direction of an arrow "F" in the drawings refers to the "front" direction, the direction of an arrow "B" refers to the "rear" direction, the direction of an arrow "L" refers to the "left" direction, and the direction of an arrow "R" refers to the "right" direction. Also, the direction of an arrow "U" in the drawings refers to the "up" direction, and the direction of an arrow "D" refers to the "down" direction.

The following describes an electric work vehicle according to the present example embodiment. FIG. 1 shows an electric tractor as an example of an electric work vehicle. As shown in FIG. 1, the electric tractor includes left and right front wheels 10, left and right rear wheels 11, and a cover 12.

The electric tractor also includes a body frame 2 and a driving section 3. The body frame 2 is supported by the left and right front wheels 10 and the left and right rear wheels 11.

The cover 12 is disposed in a front portion of the body of the electric tractor. The driving section 3 is provided behind the cover 12. In other words, the cover 12 is provided in front of the driving section 3.

The driving section 3 includes a protective frame 30, a seat 31, and a steering wheel 32. A driver can sit on the seat 31. Accordingly, the driver can get on the driving section 3. The steering wheel 32 is operated to change the orientation of the left and right front wheels 10. The driver can perform various driving operations in the driving section 3.

The electric tractor includes a battery 4. Also, the cover 12 is pivotable about an opening/closing axis Q extending in the left-right direction of the body. Accordingly, the cover 12 is openable and closeable. When the cover 12 is closed, the battery 4 is covered by the cover 12. The battery 4 corresponds to the "power storage".

Figure 2:
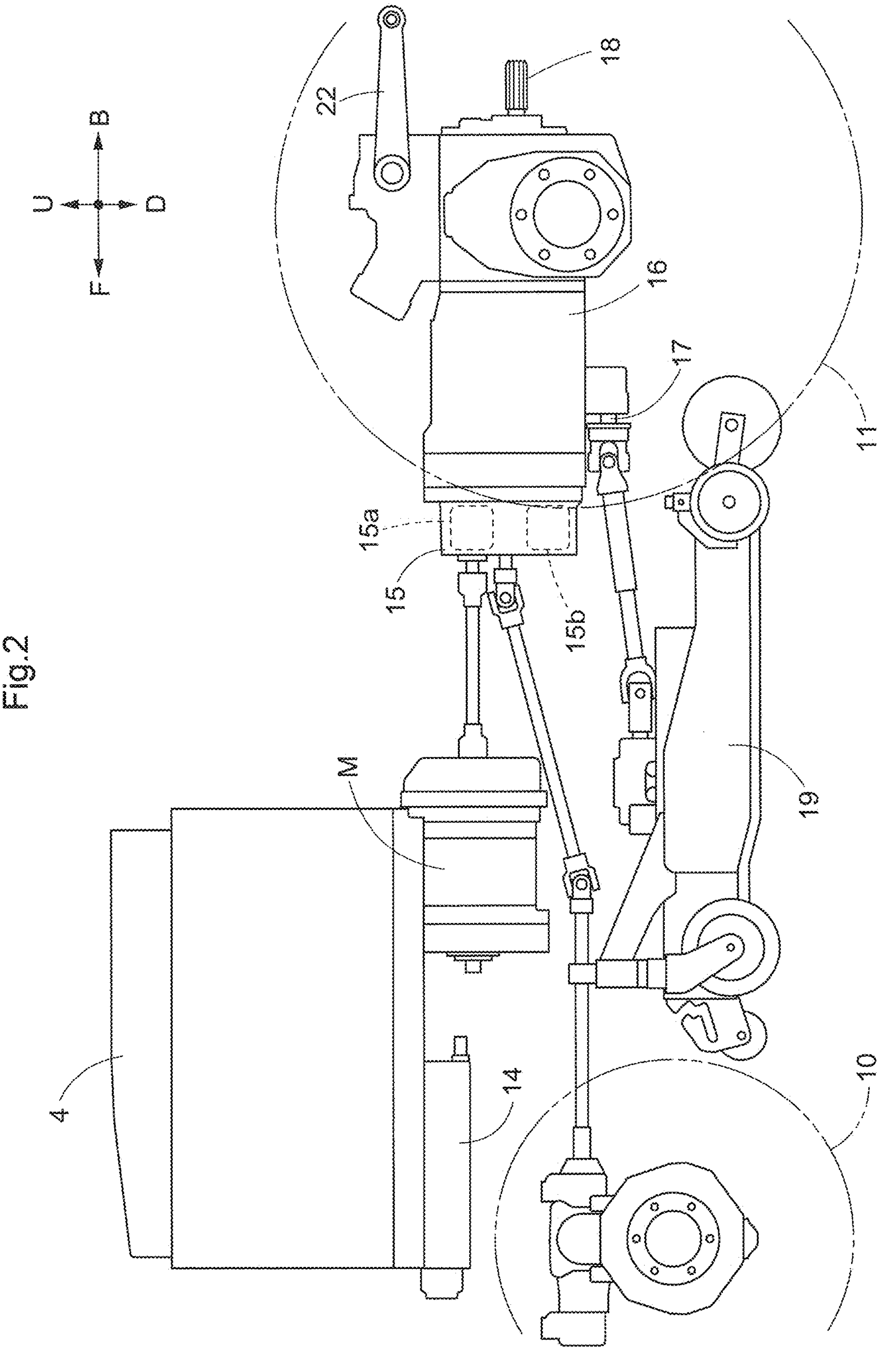

As shown in FIG. 2, the electric tractor includes an inverter 14 and a motor M. The battery 4 supplies power to the inverter 14. The inverter 14 converts DC power supplied from the battery 4 into AC power, and supplies the AC power to the motor M. The motor M is driven by the AC power supplied from the inverter 14. In other words, the motor M is driven by consuming the power stored in the battery 4.

Figure 3:
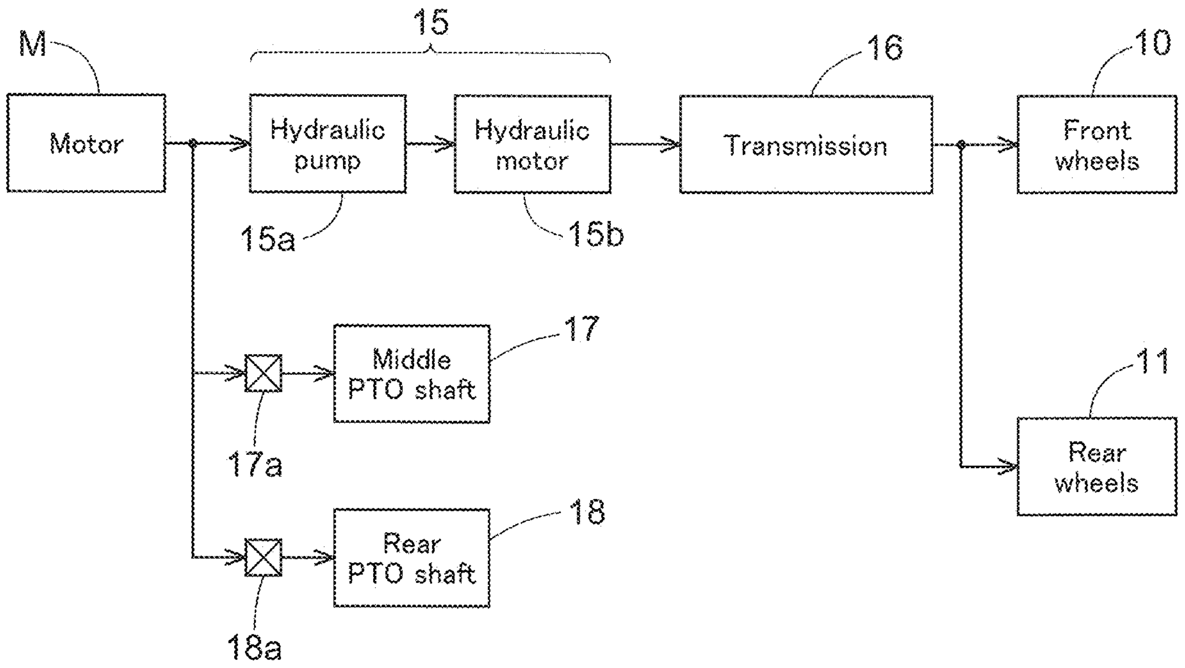
FIG. 3 is a diagram showing a flow of motive power transmission.

As shown in FIGS. 2 and 3, the electric tractor includes a hydraulic static transmission 15 and a transmission 16. As shown in FIG. 3, the hydraulic static transmission 15 includes a hydraulic pump 15*a* and a hydraulic motor 15*b*.

The hydraulic pump 15*a* is driven by rotational motive power transmitted from the motor M. As a result of the hydraulic pump 15*a* being driven, rotational motive power is output from the hydraulic motor 15*b*. Note that the hydraulic static transmission 15 is configured to change the speed of the rotational motive power between the hydraulic pump 15*a* and the hydraulic motor 15*b*. Also, the hydraulic static transmission 15 is able to change the transmission ratio in a stepless manner.

The rotational motive power output from the hydraulic motor 15*b* is transmitted to the transmission 16. The rotational motive power transmitted to the transmission 16 is subjected to speed change by a gear transmission mechanism included in the transmission 16, and is distributed to the left and right front wheels 10 and the left and right rear wheels 11. Thus, the left and right front wheels 10 and the left and right rear wheels 11 are driven.

As shown in FIGS. 2 and 3, the electric tractor also includes a middle PTO shaft 17 and a rear PTO shaft 18. A first clutch 17*a* is interposed between the motor M and the middle PTO shaft 17. Also, a second clutch 18*a* is interposed between the motor M and the rear PTO shaft 18.

The first clutch 17*a* and the second clutch 18*a* function as PTO clutches. The first clutch 17*a* and the second clutch 18*a* are each configured to be able to change its state between an ON state of transmitting power and an OFF state of not transmitting power. When the first clutch 17*a* is in the ON state, rotational motive power is transmitted from the motor M to the middle PTO shaft 17. Also, when the second clutch 18*a* is in the ON state, rotational motive power is transmitted from the motor M to the rear PTO shaft 18. The first clutch 17*a* and the second clutch 18*a* correspond to the "work motive power transmitter" that is capable of performing motive power transmission from the motor M to the work device.

In this way, the rotational motive power output from the motor M is distributed to the hydraulic pump 15*a*, the middle PTO shaft 17, and the rear PTO shaft 18. With this, the middle PTO shaft 17 and the rear PTO shaft 18 are rotated. In other words, the motor M drives at least either the travel device or the work device by consuming the power stored in the battery 4.

If a work device is connected to the middle PTO shaft 17 or the rear PTO shaft 18, the work device is driven by the rotational motive power transmitted by the middle PTO shaft 17 or the rear PTO shaft 18. For example, as shown in FIG. 2, in the present example embodiment, a mowing device 19 is connected to the middle PTO shaft 17. The mowing device 19 is driven by the rotational motive power transmitted by the middle PTO shaft 17.

The mowing device 19 is suspended and supported by a link 20. A middle lift arm 21 is coupled to the link 20. The middle lift arm 21 is hydraulically driven to swing up and down to lift and lower the link 20. In other words, the work device exemplified by the mowing device 19 can be coupled to the link 20. Also, the link 20 and the work device exemplified by the mowing device 19 are movable up and down between a work position at which the work device works and a non-work position higher than the work position. The middle lift arm 21 corresponds to the "elevator".

Although not shown in the drawings, a known three-point link is provided at a rear end of the body frame 2. A rear lift arm 22 is connected to this three-point link. The rear lift arm 22 is hydraulically driven to swing up and down to lift and lower the three-point link. As a result, the three-point link and the work device coupled to the three-point link are movable up and down between the work position at which the work device works and the non-work position higher than the work position. The rear lift arm 22 corresponds to the "elevator".

Figure 4:
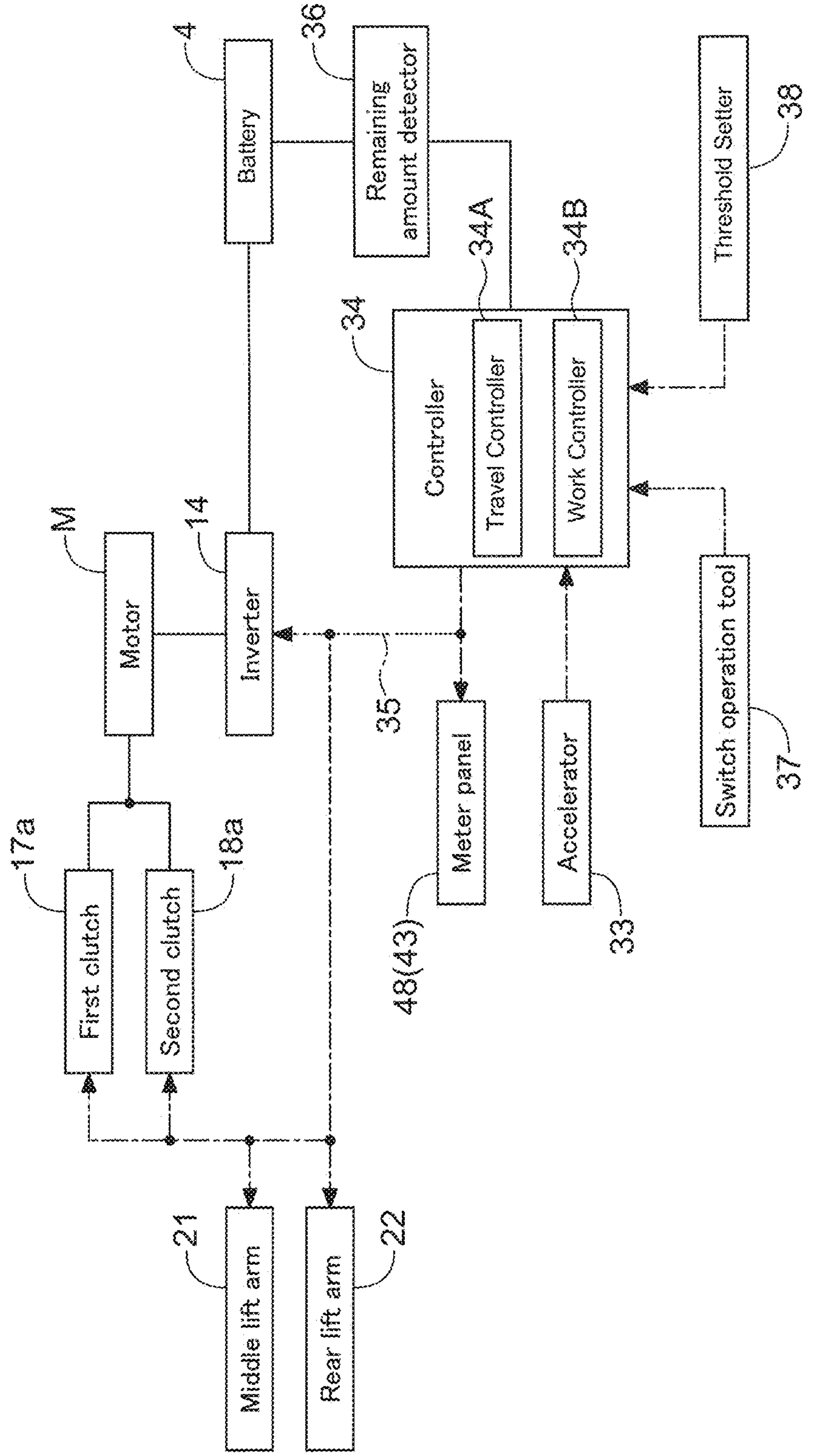
FIG. 4 is a block diagram showing a configuration of control of an electric work vehicle.

As shown in FIG. 4, the control configuration of the motor M includes an accelerator 33, a controller 34 configured or programmed to control the driving of the motor M, and the inverter 14. The controller 34 is the core element of the control system of the electric work vehicle and may be configured as a collection of a plurality of ECUs, for example. The accelerator 33 is provided near the steering wheel 32. Although not shown in the figure, the accelerator 33 includes a lever that can be pivoted and operated, and a potentiometer to detect the amount of pivoting operation of the lever. The accelerator 33 is connected to the controller 34. The controller 34 is connected to the inverter 14, a valve controller of the middle lift arm 21, a valve controller of the rear lift arm 22, a controller of the first clutch 17*a*, and a controller of the second clutch 18*a*, via a signal harness 35 of the CAN (Controller Area Network) type. The controller 34 is configured or programmed to include a travel controller 34A and a work controller 34B.

The travel controller 34A outputs a command signal to the inverter 14 in response to a command from the accelerator 33. The inverter 14 controls the output of the motor M by adjusting the power (such as a voltage value, a frequency, and a current value) to be supplied to the motor M from the battery 4, in response to the command signal from the controller 34.

The work controller 34B outputs command signals to the respective controllers of the middle lift arm 21, the rear lift arm 22, the first clutch 17*a*, and the second clutch 18*a* in response to a command from a not-shown work operation tool. The not-shown work operation tool refers to, for example, a lifting and lowering lever to operate the middle lift arm 21, a lifting and lowering lever to operate the rear lift arm 22, a lever and a button to operate the first clutch 17*a*, a lever and a button to operate the second clutch 18*a*, and the like.

The battery 4 is, for example, a lithium-ion battery. Although not shown in the figure, the battery 4 may include a number of small low-voltage unit batteries (cells) stacked together. The output voltage of the battery 4 is, for example, 250 volts. The unit batteries (cells) are stored in a storage case. These unit batteries (cells) are sealed by the storage case.

A remaining amount detector 36 detects the remaining amount of power that can be supplied by the battery 4 based on the voltage output from the battery 4. The value detected by the remaining amount detector 36 is transmitted to the controller 34.

An operation panel 43 includes a meter panel 48. The meter panel 48 is connected to the controller 34, and the controller 34 is configured or programmed to control the operation of the meter panel 48. The meter panel 48 corresponds to the "display".

Figure 5:
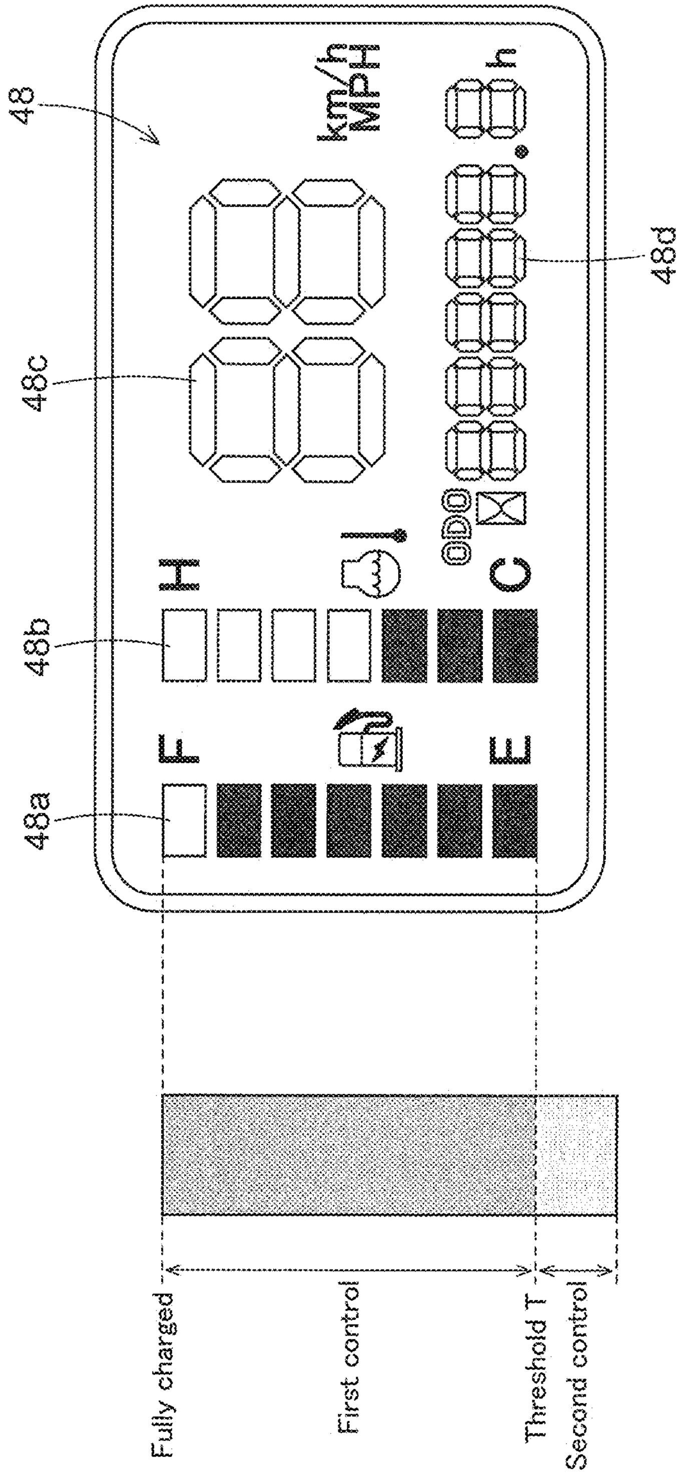
FIG. 5 is a diagram showing a value of the remaining amount of power displayed on a meter panel.

As shown in FIG. 5, the meter panel 48 includes a remaining battery amount display area 48*a*, a battery temperature display area 48*b*, a speed display area 48*c*, a multi-purpose display area 48*d*, and the like. The remaining battery amount display area 48*a* is formed as a segmented bar graph and displays the remaining amount of power that can be supplied by the battery 4 in stages. In other words, the meter panel 48 can display the remaining amount of power that can be supplied by the battery 4. The battery temperature display area 48*b* is also formed as a segmented bar graph and displays the temperature of the heat generated by the battery 4 in stages. The speed display area 48*c* and the multi-purpose display area 48*d* are seven-segment displays commonly used to display digital numerical values. The speed display area 48*c* displays, for example, the travel state of the vehicle (ground speed), the work state (e.g., the rotational speeds of the middle PTO shaft 17 and the rear PTO shaft 18), and so on. The multi-purpose display area 48*d* is normally used as an hour meter or a meter to display battery consumption per travel, but also displays an error code when an error has occurred.

The portion of the remaining battery amount display area 48*a* indicated by "F" indicates a state in which the battery 4 is fully charged. The portion of the remaining battery amount display area 48*a* indicated by "E" indicates a state in which the power that can be supplied by the battery 4 is about to be depleted. In the present example embodiment, a value of the remaining amount (remaining amount value) of, for example, 10 percent of the total capacity of power that can be supplied by the battery 4 is set as a threshold T. When the display of the segmented bar graph in the remaining battery amount display area 48*a* drops to the "E" portion, the remaining amount of power that can be supplied by the battery 4 remains as set by the threshold T. In other words, the meter panel 48 displays the remaining amount within the range from the total capacity of power that can be supplied by the battery 4 to the threshold T. As a result, even if the display of the segmented bar graph in the remaining battery amount display area 48*a* drops to the "E" portion, the work vehicle can still travel with the remaining power of the battery 4.

The threshold T can be set according to, for example, the distance between the agricultural field to be worked on and a charging station. The controller 34 can input signals from a threshold setter 38. The threshold setter 38 is, for example, a volume knob, a switch, or a software button displayed on the meter panel 48. The threshold setter 38 accepts human operation. The controller 34 can set the threshold T based on the human operation performed on the threshold setter 38. By the driver operating the threshold setter 38, the threshold T can be set within a range of, for example, about 5 percent or more and about 20 percent or less of the total capacity of power that can be supplied by the battery 4, i.e., the capacity of the battery 4.

The controller 34 is configured or programmed to execute the first control when the remaining amount value of power is greater than the threshold T, and execute the second control when the remaining amount value of power is less than or equal to the threshold T.

The first control is a control in which the travel controller 34A can output a command signal to the inverter 14 and the work controller 34B can output command signals to the respective controllers of the middle lift arm 21, the rear lift arm 22, the first clutch 17*a*, and the second clutch 18*a*. When the remaining amount value indicating the remaining amount of power is greater than the preset threshold T, the work vehicle can travel for work based on the first control.

The second control is a control in which the travel controller 34A can output a command signal to the inverter 14 and the work controller 34B can output command signals to stop the work to the respective controllers of the middle lift arm 21, the rear lift arm 22, the first clutch 17*a*, and the second clutch 18*a*. Also, in the second control, the travel controller 34A outputs a command signal to the inverter 14 so that the power consumption of the motor M is smaller than in the first control. That is, the second control is to control the driving of the motor M so that the power consumption of the motor M is smaller than in the first control, when the remaining amount value is less than or equal to the threshold T.

In this way, the controller 34 can switch between the first control to control the driving of the motor M if the remaining amount value indicating the remaining amount is greater than the preset threshold T, and the second control to control the driving of motor M so that the power consumption of the motor M is smaller than in the first control, if the remaining amount value is less than or equal to the threshold T.

The controller 34 can input a signal from a switch operation tool 37. The switch operation tool 37 is, for example, a lever, a switch, a software button displayed on the meter panel 48, or the like. The switch operation tool 37 accepts human operation. The controller 34 can switch between the first control and the second control based on the human operation performed on the switch operation tool 37. The switch operation tool 37 corresponds to the "operation tool".

Figure 6:
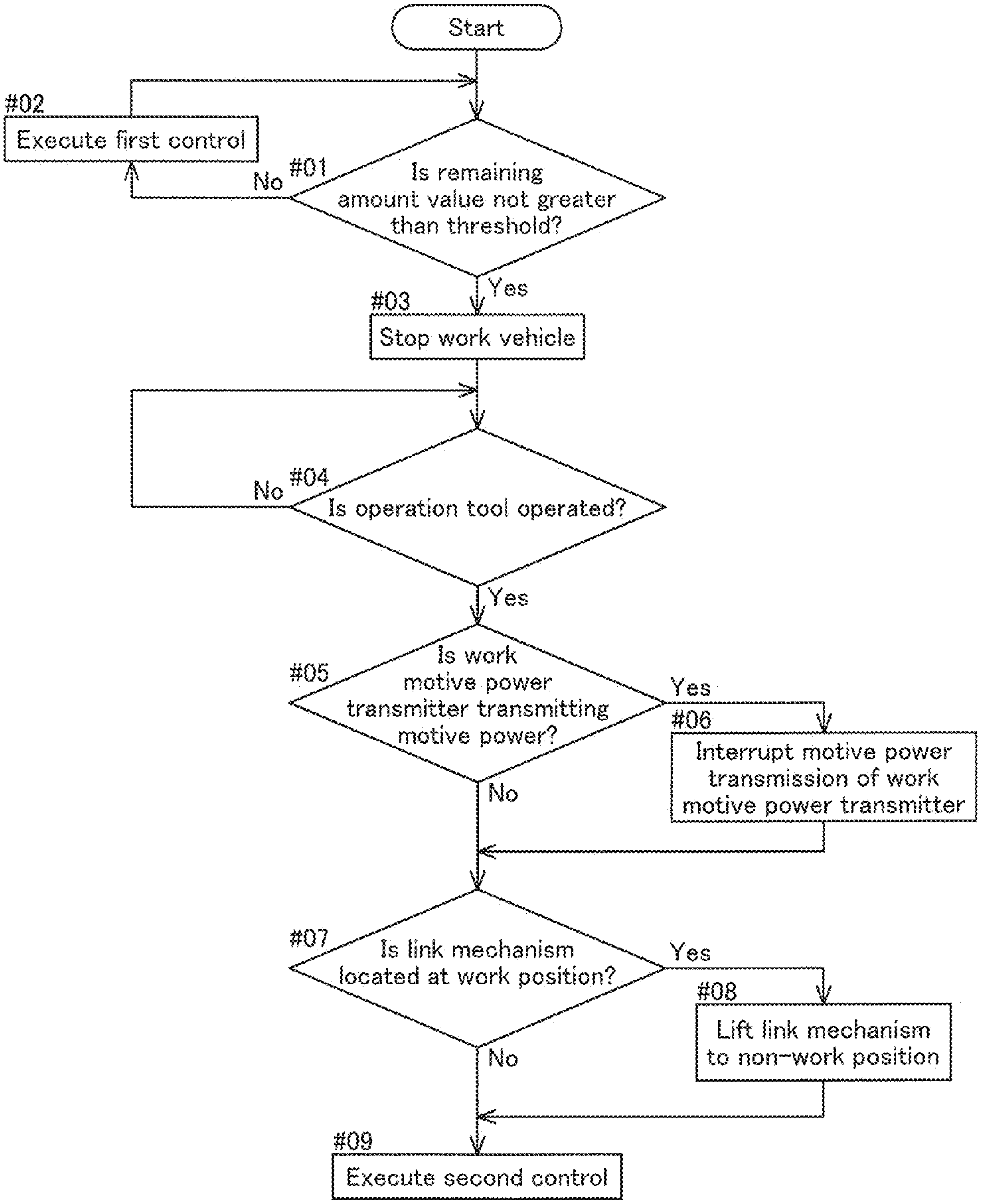
FIG. 6 is a flowchart showing processing of switching from the first control to the second control.

The switching from the first control to the second control will be described with reference to FIG. 6. The controller 34 determines whether or not the remaining amount value of power that can be supplied by the battery 4 is not greater than the threshold T (step #01). If the remaining amount value of the power is greater than the threshold T (step #01: No), the controller 34 executes the first control (step #02). On the other hand, if the remaining amount value of power is less than or equal to the threshold T (step #01: Yes), the controller 34 executes the process to stop the work vehicle (step #03). In step #03, the travel controller 34A outputs a stop signal to the inverter 14. As a result, the motor M stops, and the travel device and the work device stop as the motor M stops. That is, the controller 34 stops driving the motor M when the remaining amount value of the power that can be supplied by the battery 4 is reduced to a value less than or equal to the threshold T while the first control is being executed.

After the motor M is stopped, the controller 34 determines whether or not the switch operation tool 37 is operated (step #04). If the switch operation tool 37 is not operated (step #04: No), the process of step #04 continues with the motor M stopped. In other words, the controller 34 switches to the second control when the remaining amount value of the power that can be supplied by the battery 4 is less than or equal to the threshold T and the switch operation tool 37 is operated.

If the switch operation tool 37 is operated (step #04: Yes), the controller 34 performs determination in step #05 and step #07 in order to execute the second control. The controller 34 determines whether or not the first clutch 17*a* and the second clutch 18*a* are both transmitting the motive power (step #05). If both the first clutch 17*a* and the second clutch 18*a* are interrupting the motive power (step #05: No), the procedure moves to the process in step #07. If the first clutch 17*a* is transmitting the motive power (step #05: Yes), the work controller 34B outputs a command signal to interrupt the motive power to the controller of the first clutch 17*a*, and the first clutch 17*a* interrupts the motive power (step #06). Also, if the second clutch 18*a* is transmitting the motive power (step #05: Yes), the work controller 34B outputs a command signal to interrupt the motive power to the controller of the second clutch 18*a*, and the second clutch 18*a* interrupts the motive power (step #06). With this, the work device exemplified by the mowing device 19 is stopped. In this way, the controller 34 controls, in the second control, the work motive power transmitter to interrupt the motive power transmission.

In step #07, the controller 34 determines whether or not the link 20 and the three-point link provided at the rear end of the body frame 2 are both located at the work position. If both the link 20 and the three-point link are located at the non-work position (step #07: No), the controller 34 can control the motor M based on the second control (step #09). If the link 20 is located at the work position (step #07: Yes), the work controller 34B outputs a command signal for lifting to the controller of the middle lift arm 21, and the middle lift arm 21 swings upward (step #08). With this, the link 20 is lifted to the non-work position. In this way, in the second control, if the link 20 is located at the work position, the controller 34 controls the middle lift arm 21 to lift the link 20 to the non-work position. Also, if the three-point link is located at the work position (step #07: Yes), the work controller 34B outputs a command signal to perform lifting to the controller of the rear lift arm 22, and the rear lift arm 22 swings upward (step #08). With this, the three-point link is lifted to the non-work position. In this way, in the second control, if the three-point link is located at the work position, the controller 34 controls the rear lift arm 22 to lift the three-point link to the non-work position.

When the controller 34 executes the second control in step #09, the work device is prohibited from being driven and only the travel device can be driven. Also, the controller 34 controls, in the second control, the driving of the motor M so that the power consumption of the motor M is smaller than in the first control. This enables the work vehicle to travel while consuming only the minimum necessary power, even when the power that can be supplied by the battery 4 is reduced.

OTHER EXAMPLE EMBODIMENTS

The present invention is not limited to the configurations exemplified in the above example embodiments, and other representative example embodiments of the present invention will be given below.

(1) In the above-described example embodiments, the motor M rotates and drives both the travel device (left and right front wheels 10 and left and right rear wheels 11) and the work device (mowing device 19), but the present invention is not so limited. The motor M may be configured to drive one of the travel device and the work device.

(2) In the above-described example embodiments, the battery 4 is exemplified as the power storage, and a lithium-ion battery is exemplified as the battery 4, but the present invention is not so limited. For example, the power storage may be a solid-state battery.

(3) In the example embodiments described above with reference to FIG. 6, in the second control, the controller 34 interrupts the motive power transmission to the first clutch 17*a* and the second clutch 18*a*, but the present invention is not so limited. For example, the controller 34 may also be configured or programmed not to interrupt the motive power transmission to the first clutch 17*a* and the second clutch 18*a* in the second control. In this case, a configuration is also possible in which while the controller 34 is executing the second control, the driver performs human operation to interrupt the first clutch 17*a* and the second clutch 18*a*.

(4) In the example embodiments described above with reference to FIG. 6, in the second control, when the link 20 is located at the work position, the controller 34 controls the middle lift arm 21 to lift the link 20 to the non-work position. Also, in the second control, when the three-point link is located at work position, the controller 34 controls the rear lift arm 22 to lift the three-point link to the non-work position. The present invention is not so limited. For example, in the second control, the controller 34 may be configured or programmed to control the middle lift arm 21 not to lift the link 20 to the non-work position, and control the rear lift arm 22 not to lift the three-point link to the non-work position. In this case, a configuration is also possible in which while the controller 34 is executing the second control, the driver performs human operation to interrupt the middle lift arm 21 and the rear lift arm 22.

(5) In the example embodiments described above with reference to FIG. 6, if the remaining amount value is reduced to a value less than or equal to the threshold T while the controller 34 is executing first control, the controller 34 stops driving the motor M, but the present invention is not so limited. For example, a configuration is also possible in which if the remaining amount value is reduced to a value less than or equal to the threshold T while the controller 34 is executing the first control, the controller 34 switches to the second control without stopping driving the motor M and directly executes the second control. In this case, a configuration is also possible in which no switch operation tool 37 is provided.

(6) In the example embodiments described above with reference to FIG. 5, the remaining battery amount display area 48*a* of the meter panel 48 displays the remaining amount within the range of the total capacity of power that can be supplied by the battery 4 and the threshold T, but the present invention is not so limited. For example, the remaining battery amount display area 48*a* may be configured to display the remaining amount within a range from a state where the battery 4 is fully charged to a state where the power of the battery 4 is completely depleted.

(7) In the above-described example embodiments, the mowing device 19 is exemplified as the work device. The present invention is not so limited and examples of the work device may include a cultivator, a seeding device, a planter, a fertilizing device, a leaf cutter, a spreader, a baler, a mulcher, a stone picker, a rotary rake, a tedder, a traction-type harvest sorting device, a plucking device, an intertillage management device, and a ridging device.

(8) In the above-described example embodiments, an electric tractor is shown as an electric work vehicle, but the present invention is not so limited. Examples of the electric work vehicle may include an electric rice transplanter, an electric spreader, an electric sprayer, an electric combine, an electric mower, an electric intertillage management machine, an electric wheel loader, and an electric backhoe.

Note that the configurations disclosed in the above-described example embodiments (including the other example embodiments, the same applies hereinafter) can be applied in combination with the configurations disclosed in other example embodiments, as long as no contradiction arises. The example embodiments disclosed in the present specification are examples, and the example embodiments of the present invention are not limited thereto and can be modified as appropriate within the scope of the present invention.

Example embodiments of the present invention are applicable to not only electric tractors but also various types of electric work vehicles such as combines, rice transplanters, and construction work machines.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle connectable with a work device, the electric work vehicle comprising:

a travel device;

a power storage to store power;

a motor to drive at least either the travel device or the work device by consuming the power stored in the power storage;

a link to which the work device is connectable, the link being movable up and down between a work position at which the work device performs work, and a non-work position higher than the work position;

an elevator configured to lift and lower the link;

a work motive power transmitter to perform motive power transmission from the motor to the work device;

a remaining amount detector to detect a remaining amount of power suppliable by the power storage; and a controller configured or programmed to switch between a first control to control driving of the motor in response to a remaining amount value indicative of the remaining amount being greater than a preset threshold, and a second control to control driving of the motor so that power consumption of the motor is smaller than in the first control in response to the remaining amount value being less than or equal to the threshold, wherein in a case of the remaining amount value being less than or equal to the threshold, in response to confirming the travel device is stopped, the motive power transmission to the work device is stopped, and the link being in the non-work position, the controller is configured or programmed to start performing the second control.

2. The electric work vehicle according to claim 1, further comprising a threshold setter manually operable to set the threshold.

3. The electric work vehicle according to claim 1, wherein the threshold is set within a range of 5 percent or more and 20 percent or less of a total capacity of power suppliable by the power storage.

4. The electric work vehicle according to claim 1, wherein in a case of the work motive power transmitter performing the motive power transmission to the work device under a condition of the remaining amount value being less than or equal to the threshold, the controller is configured or programmed to control the work motive power transmitter to interrupt the motive power transmission.

5. The electric work vehicle according to claim 1, wherein in a case of the remaining amount value being less than or equal to the threshold, in response to the link being located at the work position, the controller is configured or programmed to control the elevator to lift the link to the non-work position.

6. The electric work vehicle according to claim 1, further comprising:

a manually operable operation tool; wherein the controller is configured or programmed to switch to the second control in response to the operation tool being operated with the remaining amount value being less than or equal to the threshold.

7. The electric work vehicle according to claim 1, further comprising:

a display to display the remaining amount within a range from a total capacity of power suppliable by the power storage to the threshold.

* * * * *